(12) United States Patent
Mo et al.

(10) Patent No.: US 7,643,492 B2
(45) Date of Patent: Jan. 5, 2010

(54) NETWORK BANDWIDTH RESERVATION METHOD

(75) Inventors: Li Mo, Plano, TX (US); Jennifer J. Liu, Plano, TX (US); Abinder S. Dhillon, Allen, TX (US); James A. Spallin, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 621 days.

(21) Appl. No.: 09/978,928

(22) Filed: Oct. 15, 2001

(65) Prior Publication Data
US 2002/0181508 A1 Dec. 5, 2002

Related U.S. Application Data

(60) Provisional application No. 60/294,432, filed on May 30, 2001.

(51) Int. Cl.
*H04L 12/28* (2006.01)
*G06F 15/173* (2006.01)

(52) U.S. Cl. .................. 370/395.21; 370/468; 709/226

(58) Field of Classification Search ............... 370/229, 370/235, 400, 409, 395.21, 468; 709/226–233
See application file for complete search history.

(56) References Cited

U.S. PATENT DOCUMENTS

| | | | |
|---|---|---|---|
| 6,144,661 A * | 11/2000 | Katsube et al. ............ 370/390 |
| 6,163,527 A | 12/2000 | Ester et al. | |
| 6,336,129 B1 * | 1/2002 | Ise et al. .................... 709/201 |
| 6,341,127 B1 | 1/2002 | Katsube et al. | |
| 6,760,774 B1 * | 7/2004 | Soumiya et al. ............ 709/233 |
| 7,281,043 B1 * | 10/2007 | Davie ........................ 709/226 |
| 2002/0103924 A1 * | 8/2002 | Nomura ..................... 709/235 |
| 2004/0131013 A1 * | 7/2004 | Ise et al. .................... 370/229 |

FOREIGN PATENT DOCUMENTS

| JP | 2000-078145 | * | 3/2000 |
|---|---|---|---|
| JP | 2000-244507 | * | 9/2000 |

OTHER PUBLICATIONS

Dongwook Lee, Virtual circuit connection method for RSVP multicasting supporting heterogeneous receivers on the ATM network, 1998, IEEE, p. 1474-1476.*
Hungkei keith chow, implementation and performance Evaluation of ISAC, 1998, IEEE, pp. 1219-1225.*
Duffield et al., "A Flexible Model for Resource Management in Virtual Private Networks," AT&T Labs-Research, Florham Park, NJ, published in ACM Sigcomm, San Diego, 1999.
World Wide Web, http://www.cis.ohio-state.edu/~jain/cis788-97/virtual_lans/index.htm, Suba Varadarajan, "Virtual Local Area Networks", printed on Feb. 7, 2000, 12 pages.

(Continued)

*Primary Examiner*—Steven H. D. Nguyen
(74) *Attorney, Agent, or Firm*—Gardere Wynne Sewell LLP; Marc A. Hubbard

(57) ABSTRACT

A method of reserving bandwidth in a network includes the steps of receiving a reservation request for a bandwidth for a hose having one ingress point and at least one egress point, and reserving the requested bandwidth for each link in the hose and assigning a reservation identifier to the hose.

7 Claims, 1 Drawing Sheet

OTHER PUBLICATIONS

World Wide Web, http://www.ietf.org/internet-drafts/draft-ietf-mpls-arch-07.txt, Eric C. Rosen, "Multiprotocol Label Switching Architucture", printed on Jan. 9, 2001, 55 pages.

World Wide Web, http://www.ietf.org/internet-drafts/draft-ietf-mpls-generalized-rsvp-te-00Peter Ashwood-Smith, et al., "Generalized MPLS Signaling -RSVP-TE Extensions", printed on Jan. 9, 2001, 19 pages.

Yates, Jennifer, et al., "Reconfiguration in IP Over WDM Access Networks", AT&T Labs—Research, AT&T Shannon Laboratories, 4 pages, Mar. 7, 2000.

Copyright 2000 by the Institute of Electrical and Electronics Engineers, Inc., "Local and Metropolitan Area Networks", IEEE Standard for Information technology, published Oct. 16, 2000, pp. 40-50.

* cited by examiner

NETWORK BANDWIDTH RESERVATION METHOD

This application claims priority to U.S. Provisional Application Ser. No. 60/294,432 filed May 30, 2001 entitled, "Network Bandwidth Reservation Method."

TECHNICAL FIELD OF THE INVENTION

This invention relates to telecommunications equipment and networks, and more particularly, to a network bandwidth reservation method.

BACKGROUND OF THE INVENTION

Metropolitan area networks are currently the focus of intense network development and competition for market share for network equipment developers. The developers are seeking the right mix of technology, quality of service (QoS) features, and traffic engineering methodologies that would provide the differentiating factors that propel them ahead of the competition. In general, traffic engineering or management are methodologies that allow network service providers to take advantage of over-subscription of network resources to reduce network cost, efficient bandwidth utilization, and QoS guarantees.

SUMMARY OF THE INVENTION

It is desirable to provide a method for more efficient bandwidth reservation for a network based on the hose model.

In accordance with an embodiment of the present invention, a method of reserving bandwidth in a network includes the steps of receiving a reservation request for a bandwidth for a hose having one ingress point and at least one egress point, and reserving the requested bandwidth for each link in the hose and assigning a reservation identifier to the hose.

In accordance with another embodiment of the present invention, a method of reserving bandwidth in a network includes the steps of sending a reservation request for a bandwidth for a hose having at least one path having one ingress point and one egress point connected by at least one link, the reservation request being sent to each egress point. The method further includes the steps of assigning an identical reservation identifier to each path in the hose, and reserving the requested bandwidth for each link in the hose between the egress point and the ingress point only once for each link in the hose.

In accordance with yet another embodiment of the present invention, a network includes a plurality of nodes, at least one hose defined in the network including at least one ingress node and at least one egress node, at least one path defined in the hose having one ingress node and one egress node, and each link between nodes in the hose having an identical bandwidth reserved for the hose.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
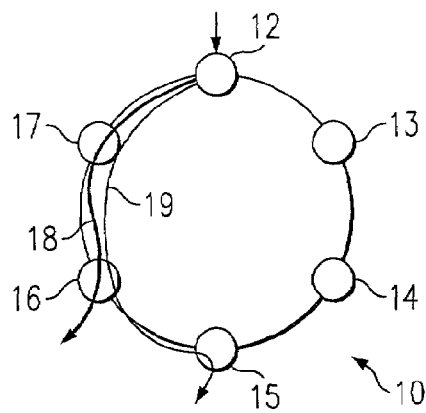
FIG. 1 is a simplified diagram of a network.

FIG. 1 is a simplified diagram of a network 10. Network 10 includes a plurality of nodes 12-17 connected in a ring configuration. Though network 10 is configured as a ring network, the present invention is applicable to any network configuration in which a hose model may be implemented.

Figure 2:
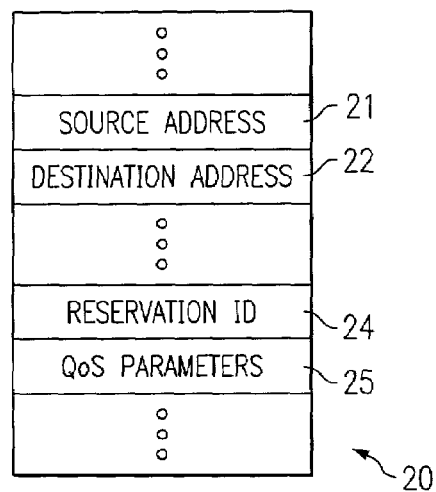
FIG. 2 is a simplified diagrammatical representation of exemplary parameters of a reservation request message according to the teachings of the present invention.
Figure 3:
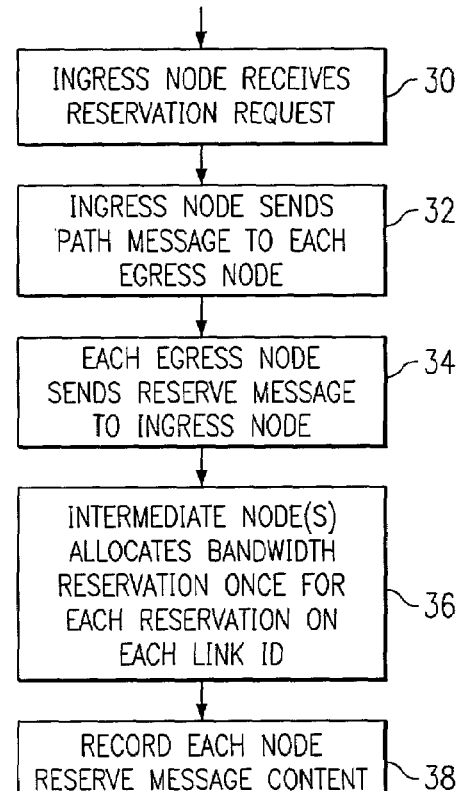
FIG. 3 is a simplified flowchart of an embodiment of a bandwidth reservation process according to the teachings of the present invention.

Referring to FIGS. 2, a simplified diagrammatical representation of exemplary parameters 10 of a path message is shown. Referring to FIG. 3, a simplified flowchart of an embodiment of a bandwidth reservation process according to the teachings of the present invention is shown. In block 30 of the flowchart, ingress node 12 receives a hose reservation request using a signaling protocol such as RSVP (resource reservation protocol). As shown in FIG. 1, the received hose reservation is for a "hose" which includes a path 18 beginning at an ingress node 12 and two egress links ending at egress node 16 and egress node 15. The reservation request includes necessary parameters to set up the hose bandwidth reservation against the egress links, such as the source address, destination address, a unique reservation identifier, and QoS parameters. The source address may be an IP address of a source coupled to a specific ingress node port, and the destination address may be an IP address of an egress node. QoS parameters may include committed bit rates, maximum bit rates, and related transmission requirements to ensure a certain level and quality of service. The reservation or SLS (service level specification) identifier is an identifier used to ensure that bandwidth reservation is not duplicated, according to the teachings of the present invention.

Figure 4:
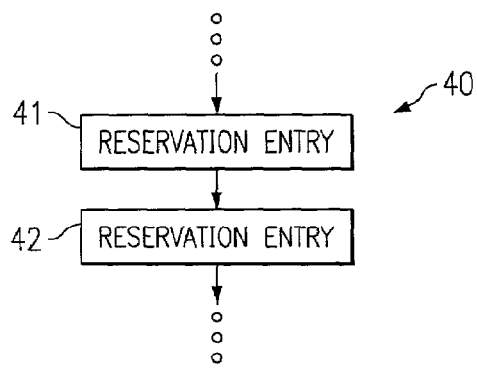
FIG. 4 is a simplified diagram of an embodiment of a data structure for recording reservations according to the teachings of the present invention.

In block 32 of the flowchart in FIG. 3, ingress node 12, upon receiving the reservation request, sends a path establishment message to each egress node. A signaling protocol such as RSVP may be used to transmit the messages associated with making, modifying and deleting reservations. The path establishment message also includes the hose reservation parameters, including the reservation identifier. In response to receiving the path establishment message, each egress node then sends a reserve message back to ingress node 12, as shown in block 34. The reserve message from egress node 16 is first received by an intermediate node 17. In block 36, intermediate node 17 makes a note of the reservation identifier, notes that it does not have an entry for the same reservation identifier in its reservation table or database (FIG. 4), and reserves the requested bandwidth on the link between egress node 16 and intermediate node 17. As shown in FIG. 4, reservation table may be structured as a linked list 40 of reservation entries 41-42, or any other suitable data structure. In block 38, the reservation is recorded in the reservation table indexable by the reservation identifier. Intermediate node 17 passes the reservation message to ingress node 12. Upon receiving the reserve message, ingress node 12 also checks its reservation table for an entry having the reservation identifier in the reserve message, records it in the reservation table, and also reserves the requested bandwidth on the link between node 12 and node 17.

As described above, the second egress node, node 15, also sends a reserve message back to ingress node 12. Intermediate node 16 receives the reserve message. In block 36, intermediate node 16 makes a note of the reservation identifier in the reserve message, notes that it does not have an entry for the reservation identifier in its reservation table, and reserves the requested bandwidth on the link between egress node 15 and intermediate node 16. In block 38, the reservation is recorded in the reservation table of node 16 indexable by the reservation identifier. Intermediate node 16 then passes the reservation message to intermediate node 17. Upon receiving the reserve message, intermediate node 17 looks up its reservation table for entries having the reservation identifier in the reserve message. Because intermediate node 17 has already reserved bandwidth for the same reservation identifier and thus the same hose, intermediate node 17 just adds an entry to the reservation table but does not act on it. Intermediate node 17 then passes the reserve message to ingress node 12. Upon receiving the reserve message, ingress node 12 also checks its reservation table for an entry having the reservation identifier. Node 12 also finds an entry having the same reservation identifier in its reservation table. Node 12 adds an entry to its reservation table noting the reservation, but does not act on it.

The end result is a hose with an ingress point at node 12 and two egress points at nodes 16 and 15. Each inter-node link has the same bandwidth reservation for the hose. In other words, although there are two paths through nodes 16 and 17, the reserved bandwidth for the hose is the same there as the link between nodes 16 and 15, where there is only one path.

Figure 5:
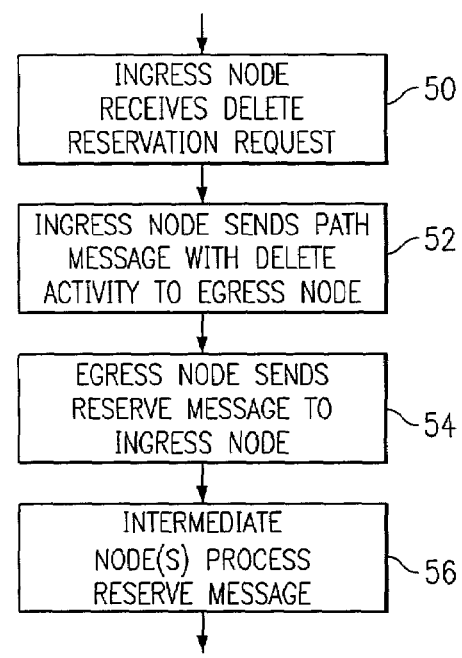
FIG. 5 is a simplified flowchart of an embodiment of a bandwidth reservation deletion/modification process according to the teachings of the present invention.

FIG. 5 is a simplified flowchart of an embodiment of a bandwidth reservation deletion/modification process according to the teachings of the present invention. In block 50, ingress node 12 receives a hose modification or deletion request from the customer. Ingress node 12 then sends a path message with the appropriate action and the reservation identifier of the hose to the egress node of the path to be changed or deleted, as shown in block 52. The path message specifies the ingress node and the egress node of the path in the hose to be changed or deleted. A modification may be to change the QoS and therefore the bandwidth allocation for the hose. The affected egress node, upon receiving the path message, sends a reserve message back to ingress node 12, as shown in block 54. The reserve message includes the ingress and egress node, reservation identifier and the requested action. Each intermediate node, upon receiving the reserve message, processes the reserve message, as shown in block 56. For example, the intermediate node looks up in its reservation table for an entry that matches the reservation identifier in the reserve message. If there is a matching entry, the change specified in the reserve message is affected. However, if the requested action is deletion, the bandwidth reservation on a link remains if there is still an active reservation with the same reservation identifier. If, for example, intermediate node 17 receives a reserve message from egress node 16 to delete path 18, it notes the reservation entry for the link between nodes 16 and 17 for the specified reservation identifier as being deleted, but maintains the entry in the reservation table. Intermediate node 17 does not actually delete the reservation since path 19 still exists for the same reservation identifier and hose.

It may be seen from the foregoing that each link between nodes in a hose has a reservation with the same specified bandwidth even when there are multiple paths and multiple egress points. A reservation is deleted only if no other active reservations remain with the same reservation identifier. Bandwidth reservation for a hose model is therefore made more efficient and better utilized. Bandwidth allocation against the ingress link may be done to manage bandwidth scheduling.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of reserving bandwidth in a network using a hose model, the network including a plurality of nodes and a plurality of links for interconnecting the nodes, the method comprising:

receiving from a customer a request for bandwidth for a hose having one ingress point and a plurality of egress points, the hose including a plurality of paths, each of the plurality of egress points being associated with different destination addresses;

assigning a hose identifier to the hose;

requesting reservation of bandwidth by transmitting a separate path message separately addressed to each of the plurality of egress points, each of the separate messages including the same hose identifier; each of the plurality of egress points sending in response a reservation request containing the hose identifier and a unique identifier that uniquely identifies the reservation message as originating from only one of the plurality of egress points; and at each intermediate node at which one of the reservation request messages is received, reserving the bandwidth, but not if a different reservation request message containing the same hose identifier has been received at the node, and forwarding the message even if no bandwidth is reserved.

2. The method, as set forth in claim 1, wherein each separate path message includes the requested bandwidth and the hose identifier; and wherein each reservation request message comprises a reserve message back to the ingress point in response to the path message, the reserve message including the hose identifier and the unique identifier uniquely associated with the egress point.

3. The method, as set forth in claim 2, wherein each egress point sends the reserve message back to the ingress node through at least one intermediate node; and wherein the method further includes recording the hose identifier at the at least one intermediate node.

4. The method, as set forth in claim 1, further comprising: receiving a request to delete a path in a hose reservation, the request including the hose identifier and the ingress and egress points of the path; and at each intermediate node of the path, deleting the bandwidth reservation only if there is no other reservation with the same hose identifier.

5. A method for reserving bandwidth for a hose at a node in a packet network, comprising:

receiving from a customer a request for a hose having a predetermined bandwidth, the hose defining an ingress node and at least two egress nodes, the hose including at least two paths, a first of the at least two paths extending between the ingress node and the first egress node and a second of the at least two paths extending between the ingress node and the second egress node;

assigning to the request a hose reservation identifier;

in response to receiving the request, transmitting along the first path a first message to the first egress node, the first egress node responding to the first ingress node with a first reservation message;

receiving at the node the first reservation request for resources for a first path between the ingress node and the first egress node, the first reservation request including a hose reservation identifier;

reserving the requested resources on a link;

transmitting along the second path a second path message to the second egress node, the second egress node responding to the ingress node with a second reservation message;

receiving the second reservation request for resources for the second reservation request including the same hose reservation identifier as the first reservation request; not reserving resources requested in the second reservation request.

6. The method of claim 5, further comprising recording the first and second reservation requests in a data structure.

7. The method of claim 6, further comprising:

receiving a message indicating deletion of the first reservation;

deleting the first reservation from the data structure; and releasing the reserved resources only if the second reservation request is deleted.

* * * * *

UNITED STATES PATENT AND TRADEMARK OFFICE
CERTIFICATE OF CORRECTION

PATENT NO. : 7,643,492 B2  
APPLICATION NO. : 09/978928  
DATED : January 5, 2010  
INVENTOR(S) : Mo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Sixteenth Day of November, 2010

David J. Kappos
*Director of the United States Patent and Trademark Office*